US010702778B2

(12) United States Patent
Rowe et al.

(10) Patent No.: US 10,702,778 B2
(45) Date of Patent: Jul. 7, 2020

(54) DYNAMIC MODIFICATION OF NAVIGATION MAPS

(71) Applicant: Disney Enterprises, Inc., Burbank, CA (US)

(72) Inventors: James Rowe, Herriman, UT (US); Travis Nixon, Centerville, UT (US)

(73) Assignee: Disney Enterprises, Inc., Burbank, CA (US)

( * ) Notice: Subject to any disclaimer, the term of this patent is extended or adjusted under 35 U.S.C. 154(b) by 1863 days.

(21) Appl. No.: 13/848,694

(22) Filed: Mar. 21, 2013

(65) Prior Publication Data

US 2014/0289648 A1    Sep. 25, 2014

(51) Int. Cl.
*A63F 13/537* (2014.01)
*A63F 13/577* (2014.01)
*A63F 13/35* (2014.01)

(52) U.S. Cl.
CPC ............ *A63F 13/537* (2014.09); *A63F 13/35* (2014.09); *A63F 13/577* (2014.09); *A63F 2300/64* (2013.01)

(58) Field of Classification Search
None
See application file for complete search history.

(56) References Cited

U.S. PATENT DOCUMENTS

2007/0200855 A1*  8/2007  Minagawa ................... 345/474
2008/0220862 A1*  9/2008  Axelrod et al. ............... 463/31
2009/0197686 A1*  8/2009  Bergelt et al. ................ 463/43

\* cited by examiner

*Primary Examiner* — Robert T Clarke, Jr.
(74) *Attorney, Agent, or Firm* — Esplin & Associates, PC (57) ABSTRACT

Objects in a virtual space may be non-traversable such that traversal by characters of the virtual space through such objects is not permitted by the physics of the virtual space. Objects may be relocated during interactive gameplay. A navigation map of the virtual space is updated interactively, e.g. after an object has been relocated, by determining which regions are traversable or non-traversable, the boundaries of these regions, and which boundaries separate adjacent traversable regions. The updated navigation map may be queried on behalf of a non-player character in the virtual space, e.g. to determine where to go and/or how to get there.

18 Claims, 7 Drawing Sheets

DYNAMIC MODIFICATION OF NAVIGATION MAPS

FIELD OF THE DISCLOSURE

This disclosure relates to creating and updating navigation maps of a virtual space, and, in particular, dynamically updating navigation maps in response to non-traversable objects being relocated in the virtual space.

BACKGROUND

Conventionally, in a multi-character (networked) game, characters may interact in the same instance of the game. Users or players may interact with non-player characters (NPC), typically controlled through Artificial Intelligence (AI). NPCs actions and movements may be governed by the same or similar rules (e.g. physics rules) as characters controlled by human players. For example, characters may be not permitted to walk through walls or other types of non-traversable objects. The terms traversable and navigable may be used interchangeably herein.

Typically, the map of the virtual space is similar if not the same for all players. That is, the terrain is mostly the same, even if some smaller objects may be in different locations for different players. Some games allow a player to design his own terrain prior to engaging other characters interactively. For example, a player may design a battlefield, usually in a separate mode of operation that is different from interactive gameplay.

One way to guide characters through a virtual space may be by constantly checking and/or detecting whether an individual character collides with another character or an object of the type that the individual character is not permitted to traverse. Computationally, collision detection may be costly. As a result, techniques that reduce the need for collision detection may be desirable. For complex virtual spaces that include many objects and many characters, collision detection may be cost-prohibitive, at least unless all or most of the terrain in the virtual space remains fixed in place, having unchanging properties with regard to traversability.

SUMMARY

One aspect of the disclosure relates to a system configured to provide a virtual space to users. Providing the virtual space may include hosting the virtual space over a network for a virtual space provider. The system may be configured to interactively create and/or update one or more navigation maps in a virtual space. The virtual space may implement a networked game. The system may include one or more servers. The server(s) may be configured to communicate with one or more client computing platforms according to, e.g., a client/server architecture. The users may access the system and/or the virtual space via client computing platform(s).

The server may implement one or more instances of the virtual space. Users may interact with an instance of the virtual space through individual client computing platforms. Individual client computing platforms may interact and/or communicate with the server over one or more networks. Client computing platforms may be associated with users. Individual client computing platforms may be associated with individual users.

The virtual space may include objects. Objects may include characters and/or other objects. As used herein, the terms character and object may be used interchangeably. Objects may be controlled by an individual user using an individual client computing platform, by artificial intelligence (AI), by the instance of the virtual space that is hosted by the server, by testing resources, by other components of the virtual space, and/or any combination thereof. The controlling entity of an object may be referred to as the point of control. For example, some objects may be controlled by artificial intelligence during a first period (also referred to as AI-controlled), and user-controlled during a second period. Interacting objects may be controlled in different ways, for example by two different users and/or by non-player characters (NPC).

A navigation map may include multiple regions in a virtual space. The regions may include traversable regions and non-traversable regions. Traversable regions may be regions that the physics and/or rules within the virtual space permit characters to traverse. Non-traversable regions may correspond to non-traversable objects located in the virtual space. Traversal through the non-traversable objects may not be permitted by the physics and/or rules within the virtual space. The regions in a virtual space may be traversable regions and/or non-traversable regions. In some implementations, a navigation map includes information regarding one or more boundaries of a region. For example, the navigation map may include boundaries between adjacent traversable regions. In some implementations, a virtual space may include multiple navigation maps. In some implementations, a navigation map may correspond to a level in a game. In some implementations, a navigation map may correspond to a planar area in the virtual space. In some implementations, a navigation map may correspond to a surface within the virtual space, e.g. a surface that may be reachable by one or more characters in the virtual space.

The server(s) may be configured to execute one or more computer program modules. The computer program modules may include one or more of a space module, an interaction module, a first region module, a second region module, a boundary module, a map module, a navigation module, and/or other modules. The space module may be configured to implement one or more instances of the virtual space executed by the computer modules to determine views of the virtual space. The interaction module may be configured to generate and/or determine user interfaces for presentation to users, and/or to obtain instructions to modify locations of objects in the virtual space. The first region module may be configured to determine a set of non-traversable regions. The second region module may be configured to determine a set of traversable regions. The boundary module may be configured to define boundaries for the traversable regions. The map module may be configured to update the navigation map to reflect traversable and non-traversable regions, e.g. after one or more locations of one or more objects have been modified. The navigation module may be configured to query the navigation map such that characters traverse the traversable regions. Practical limits prohibit recreating one or more navigation maps for the virtual space from scratch after every action or movement in the virtual space, including, e.g., limits pertaining to computing power, required storage, and/or required bandwidth.

The server(s) and/or the client computing platform(s) may include electronic storage. The electronic storage may comprise non-transitory storage media that electronically stores information. The electronic storage may be configured to store one or more navigation maps.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
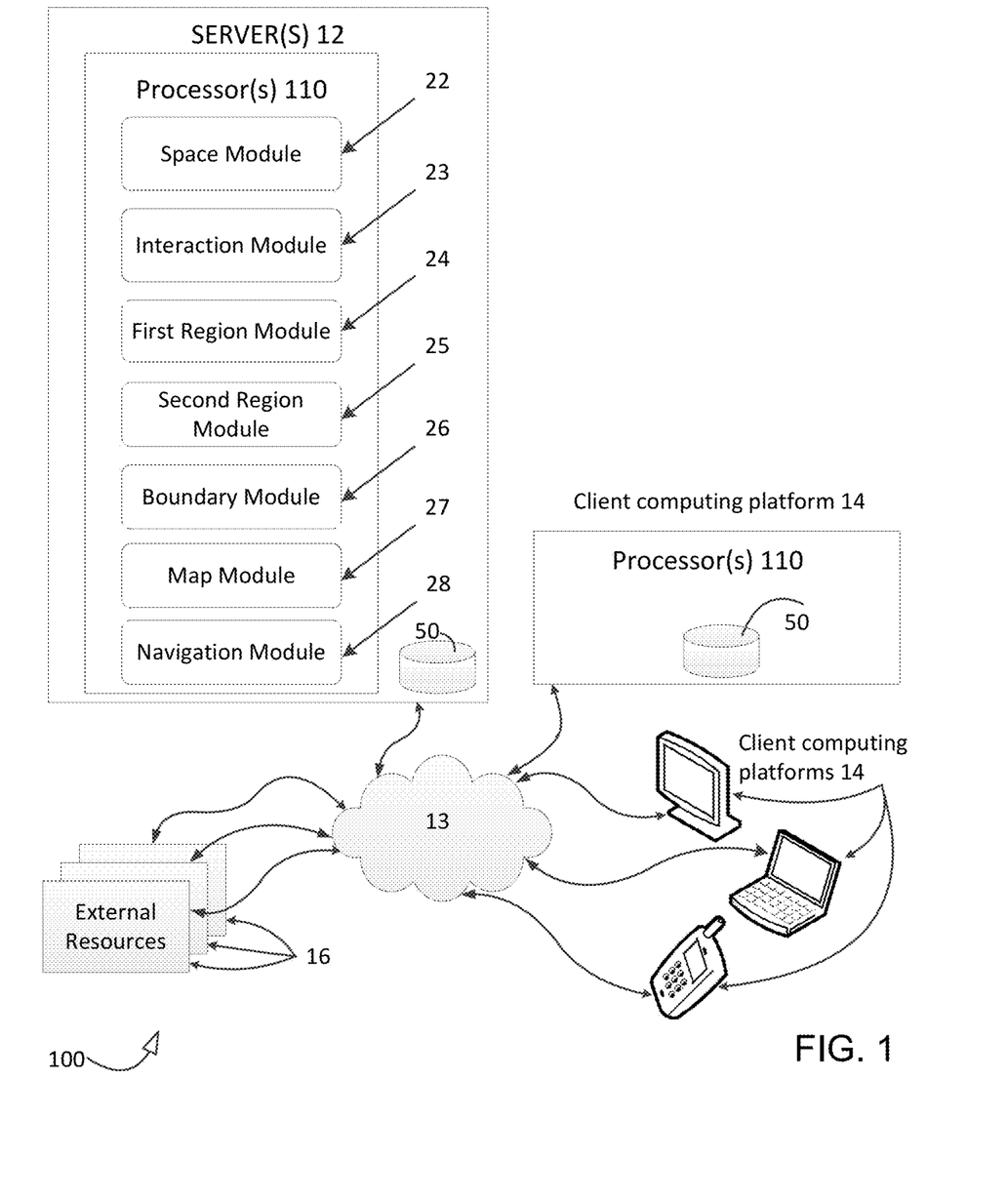
FIG. 1 illustrates a system configured to interactively update navigation maps in a virtual space, in accordance with one or more embodiments.

FIG. 1 illustrates a system 100 configured to provide a virtual space to users. Providing the virtual space may include hosting the virtual space over a network for a virtual space provider. System 100 may be configured to interactively create and/or update one or more navigation maps in a virtual space. System 100 may include one or more servers 12. Server 12 may be configured to communicate with one or more client computing platforms 14 according to a client/server architecture. The users may access system 100 and/or the virtual space via client computing platforms 14.

Server 12 may include electronic storage 50, one or more processors 110, and/or other components. Server 12 and/or processor 110 may be configured to execute one or more computer program modules. The computer program modules may be configured to enable an expert or user associated with the given client computing platform 14 to interface with system 100 and/or external resources 16, and/or provide other functionality attributed herein to client computing platforms 14.

Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

By way of non-limiting example, the given client computing platform 14 may include one or more of a desktop computer, a laptop computer, a handheld computer, a tablet computing platform, a NetBook, a Smartphone, a gaming console, and/or other computing platforms.

External resources 16 may include sources of information, hosts and/or providers of virtual environments outside of system 100, external entities participating with system 100, and/or other resources. In some implementations, some or all of the functionality attributed herein to external resources 16 may be provided by resources included in system 100.

The computer program modules may include one or more of a space module 22, an interaction module 23, a first region module 24, a second region module 25, a boundary module 26, a map module 27, a navigation module 28, and/or other modules.

Server(s) 12 and/or client computing platform(s) 14 may include electronic storage 50. Electronic storage 50 of server 12 may store different information than electronic storage 50 of an individual client computing platform 14. In some implementations, functionality attributed herein to processor 110 of server 12 or to a computer program module of server 12 may be not limited to server 12, but rather may be provided by resources of individual client computing platforms 14, and/or jointly provided by both server 12 and one or more client computing platforms 14. The depiction in FIG. 1 is not intended to be limiting in any way with regard to the location of any particular functionality described herein. The terms "client computing platform" and "client" may be used interchangeably herein.

Server 12, client computing platforms 14, and/or external resources 16 may be operatively linked via one or more electronic communication links. For example, such electronic communication links may be established, at least in part, via a network 13 such as the Internet and/or other networks. It will be appreciated that this is not intended to be limiting, and that the scope of this disclosure includes implementations in which servers 12, client computing platforms 14, and/or external resources 16 may be operatively linked via some other communication media.

The term "character" may refer to an object (or group of objects) present in the virtual space that represents an individual user, is controlled by an individual user, and/or is controlled by another source such as artificial intelligence, network resources, testing resources, and/or other sources. The user characters may include avatars. A given character associated with a given user may be controlled by the given user with which it is associated. In some embodiments, a given character may be associated with only one user at a time. In some embodiments, a character may be associated with two or more users such that each associated user can control different controllable aspects of the given character.

Space module 22 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, one or more navigation maps, areas and/or regions in the virtual space, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 22. Expressions of the instance executed on the clients may include space logic that effectively provides for execution of a limited version of the instance on a client that is synchronized and/or verified with state information received from space module 22. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The instance executed by the computer modules may be synchronous, asynchronous, and/or semi-synchronous. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The topography may include traversable regions and non-traversable regions.

In some implementations, the topography may be modified, e.g. during interactive (e.g. real-time) gameplay by one or more users. In other words, such modifications may be made while a game is in progress, as distinguished from arranging and/or building, say, a level or area of a game prior to interaction with other users and/or other (possibly non-player) characters. Such modifications made during interactive gameplay may be referred to as dynamic modifications, interactive modifications, or real-time modifications. For example, a user may be permitted to modify the location of topographical objects, including but not limited to buildings, bridges, hills, mountains, cliffs, waterfalls, canals, lakes, ponds, rivers, and/or other objects. The term "modifying the location of" (and variations thereof) may be used interchangeably with either of the terms "moving", "relocating", or "placing" (and context-appropriate variations thereof). Newly placed objects are considered to have a modified location as well, since their location is undetermined before placement and determined after placement. As used herein, the term "modification" and the term "update" may be used interchangeably. For example, a dynamic modification of a navigation map may be referred to as an interactive update of a navigation map, and so forth.

Moving non-traversable objects within the virtual space, including but not limited to topographical objects, may cause problems in navigation of characters, in particular autonomous navigation such as performed by NPCs. Characters, including but not limited to NPCs, may use navigation maps to traverse (regions of) the virtual space. Characters may need to respond to movement of objects, preferably in a manner that is (or appears) similar to typical responses of human-controlled characters. Accordingly, navigation maps need to be updated in response to movement of objects, preferably in real-time. Characters may query (real-time) updated navigation maps to navigate intelligently the virtual space. For NPCs, such queries may be made on their behalf. As used herein, the term "intelligently" refers to an appearance of actions or behavior that is similar to typical actions or behavior as initiated and/or controlled by human players or users in the virtual space. For example, intelligently navigating an area in the virtual space may be interpreted as navigating the area in such a manner that an observer may reasonably assume that a human player or user is controlling the navigation In some implementations, all or some of the topography and/or one or more regions may be aligned along one or more axes. In some implementations, all or some of the topography and/or one or more regions may be aligned (and/or fitted to) a two-dimensional or three-dimensional grid or mesh. For example, a relocated building may need to be rotated by increments of a particular number of degrees (e.g. 90 degrees), and/or fitted to a two-dimensional grid or mesh covering the surface underneath the building.

The above description of the views of the virtual space determined from the instance executed by space module 22 is not intended to be limiting. The virtual space may be presented in a more limited manner, or a richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 22, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters or NPC in the virtual space, other objects in the virtual space). The user-controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through space module 22).

Interaction module 23 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 23 in monitoring the interactions of the users may be stored in user-specific user profiles.

At a given time, interaction module 23 may determine a set of users that are currently engaged with the virtual space and/or a set of users that are currently not engaged with the virtual space. Being engaged with the virtual space may refer to being logged in to the virtual space, performing some action or interaction within the virtual space within some period (e.g., the most recent 2 minutes), and/or other taking some other action indicating ongoing and contemporaneous engagement with the virtual space.

Interaction module 23 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), activities performed in some period, missions completed in some period, average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, number of qualifying interactions with (non-player) characters in the virtual space, amount of real world money spent in the virtual space, and/or other activity parameters.

First region module 24 may be configured to determine a set of non-traversable regions. Non-traversable regions may correspond to non-traversable objects located in the virtual space through which traversal by characters of the virtual space is not permitted by the physics of the virtual space. For example, a wall may occupy a particular region on a surface within the virtual space that is a non-traversable region, since characters are not permitted to walk through the wall. The set of non-traversable regions may include one or more non-traversable regions that correspond to the location of one or more particular non-traversable objects. For example, the location of the particular one or more objects may be modified through instructions obtained by interaction module 23. Determinations by first region module 24 may be responsive to obtainment of instructions to modify one or more locations of one or more objects. In some implementations, traversability of individual regions may depend on a particular character and/or type of character. For example, a particular object may be non-traversable for human-controlled characters, but traversable for certain types of NPCs. System 100 may employ different navigation maps that correspond with different physics and/or rules regarding traversability.

Figure 2:
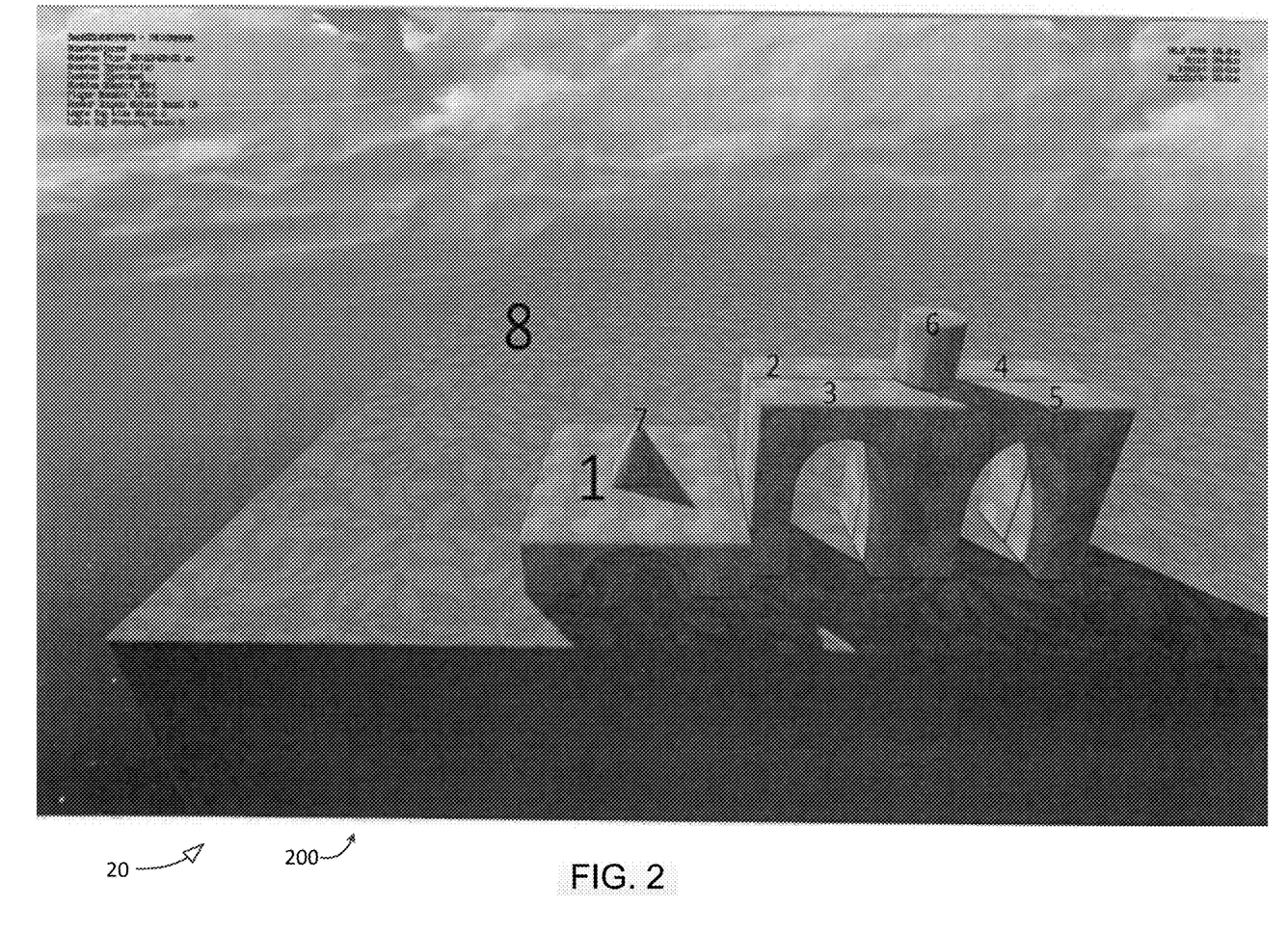
FIGS. 2-6 illustrate views of a virtual space.

By way of illustration, FIG. 2 illustrates a view 20 of the topography of a particular virtual space 200. Cardinal directions may be used for reference as per usual. As depicted, virtual space 200 includes objects 1-8. For example, objects 1-5 may be solid arches placed on top of the surface of object 8, such that a character may move underneath objects 1-5 in a north-south-direction. Characters may be not permitted to move through the walls of objects 1-5, such that the regions occupied by objects 1-5 on the surface of object 8 may be determined to be non-traversable regions for a navigation map that includes the surface of object 8. Object 7 may be (or at least have the shape of) a non-traversable cone, such that the region occupied by object 7 on the top-surface of object 1 may be determined to be a non-traversable region for a navigation map that includes the top-surface of object 1. Object 6 may be (or at least have the shape of) a non-traversable cylinder, such that the region occupied by object 6 on the combined top-surface of objects 2-5 may be determined to be a non-traversable region for a navigation map that includes this combined top-surface. Since the top-surface of object 6 may be flat, it may, at least in theory, be determined to be a traversable region.

Figure 3:
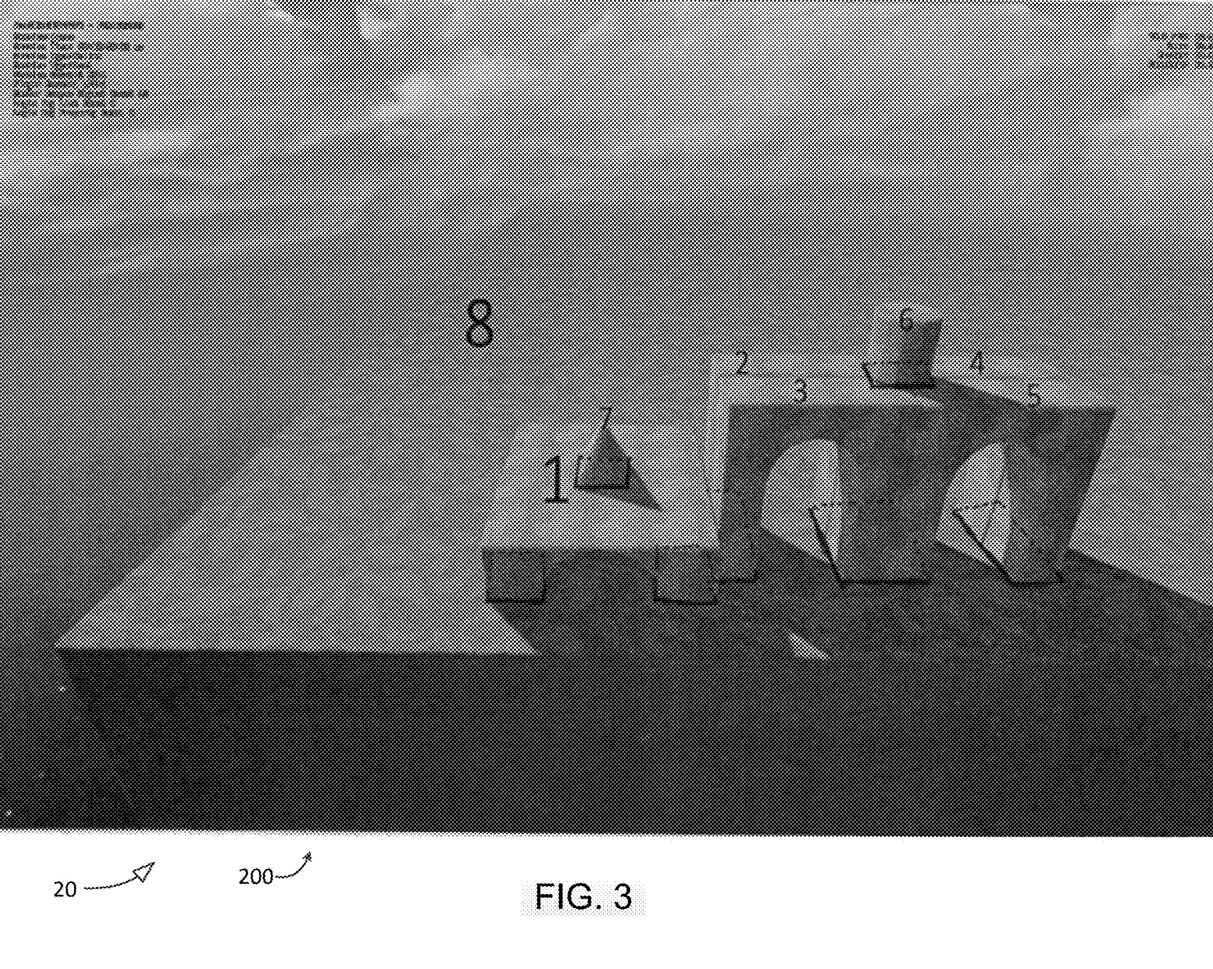

By way of illustration, FIG. 3 illustrates a view 20 of virtual space 200 that depicts non-traversable regions caused where objects 1-7 are placed on and occupy the surface of another object. In some implementations, objects and regions are aligned to axes and fitted to a (2-dimensional) grid, such that, in determining non-traversable regions, any grid units or elements that are intersected by an object may be deemed occupied, and thus, depending on the type of object, may be non-traversable. Accordingly, the non-traversable region on the top-surface of objects 2-5, caused by object 6 being placed on that surface, may be not circular-shaped (as may have been expected in light of the cylindrical shape of object 6), but rather rectangular. As depicted in FIG. 3, virtual space 200 may include, at least, a first navigation map that includes the top-surface of object 8, a second navigation map that includes the top-surface of object 1, and a third navigation map that includes the top-surface of objects 2-5. For the purposes of the examples depicted in FIGS. 2-6, characters may be not supposed to, or not permitted to, move from the top-surface of object 1 to the top-surface of object 8, or from the top-surfaces of objects 2-5 to either the top-surface of object 1 or the top-surface of object 8. Individual navigation maps may correspond to planar and/or curved areas in the virtual space (depending on the shape of the surfaces used in the virtual space).

Referring to FIG. 1, second region module 25 may be configured to determine a set of traversable regions. In some implementations, the set of traversable regions may be determined by excluding the set of non-traversable regions, as determined by first region module 24, from a set of all regions. In some implementations, determined regions may include one or more elements of the smallest unit that may be individually deemed traversable or non-traversable. The smallest such unit may correspond to the granularity of the topography in the virtual space. In some implementations, the smallest unit may match a single element of a grid or mesh that is used to align the regions and/or objects.

Figure 4:
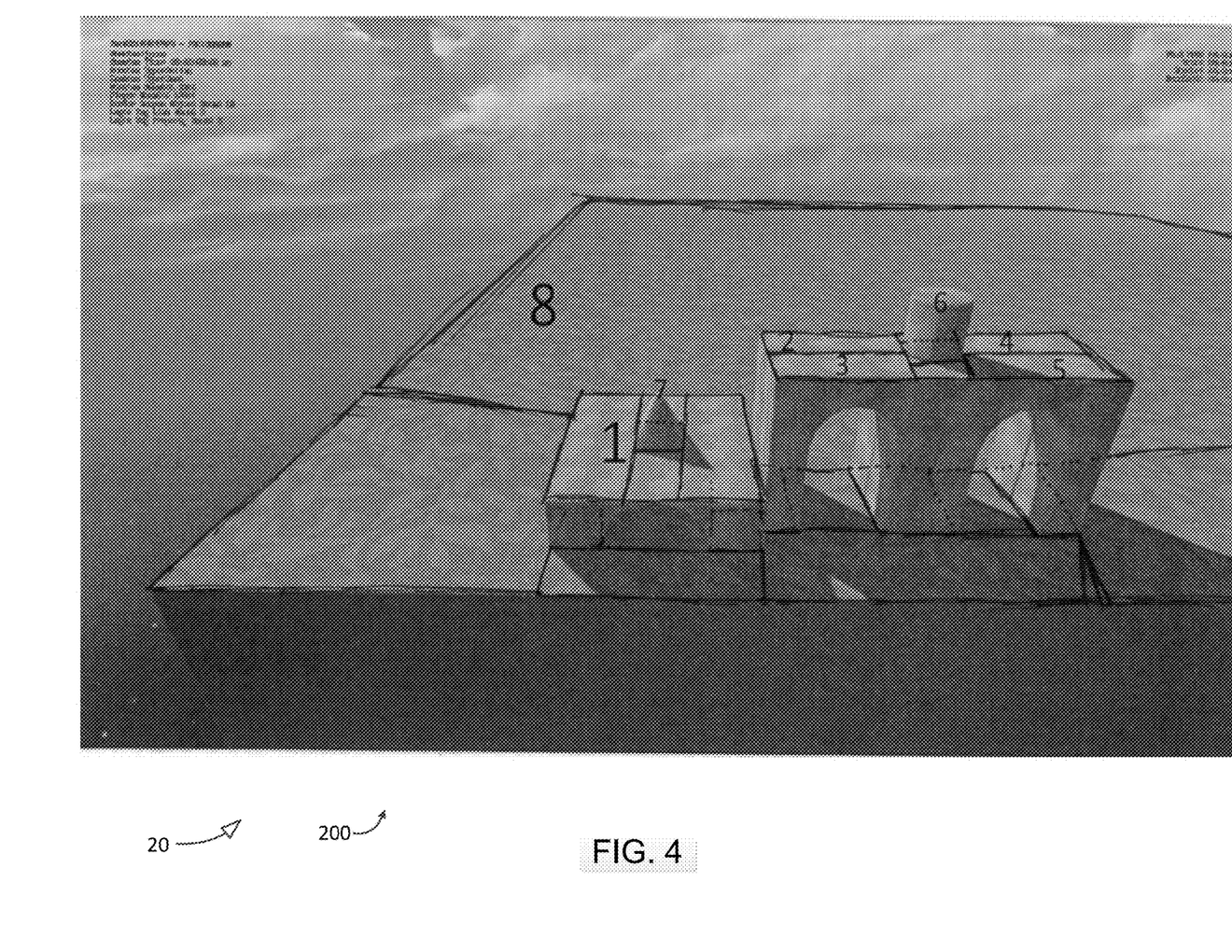

By way of illustration, FIG. 4 illustrates a view 20 of virtual space 200 that depicts traversable regions. Assume that all (hand-drawn) lines are strictly in north-south or east-west direction. In some implementations, the set of traversable regions may individually include all the grid or mesh elements that are traversable. For example, the traversable region that includes the top-surface of object 1 is relatively small, such that all grid or mesh elements may be individually enumerated or listed, except those grid or mesh elements that are intersected and thus occupied by any part of object 7. However, such an approach may not be practical, e.g. in terms of computational sots or storage requirements, for relatively large surfaces such as the top-surface of object 8. The terms "relatively small" and "relatively large" may be interpreted in relation to the smallest size of a region that may be individually deemed traversable or non-traversable.

Referring to FIG. 1, second region module 25 may be configured to combine or group together regions into a larger region under certain circumstances. Referring to FIG. 4, determination of the traversable regions may include combining or grouping together smaller regions, e.g. individual grid or mesh elements, under certain circumstances. The combined region may be contiguously traversable, e.g. having no gaps, holes, or areas that are not traversable. These circumstances may be governed by the type of region that may be described in an easy or efficient manner. For example, in a virtual space that uses a 2-dimensional grid of rectangular elements, multiple such elements may be combined or grouped together to form rectangular regions, as depicted in FIG. 4. For example, the top-surface of object 1 may be determined to have 4 traversable regions: a first region that covers the westerly third of the surface, a second region that covers the easterly third of the surface, and a third and fourth region that cover the areas between the first and second region, from the South and North edges to those grid or mesh elements that are intersected and thus occupied by any part of object 7. Other ways to determine the traversable regions of the top-surface of object 1 may be contemplated: the depiction in FIG. 4 is merely exemplary.

Referring to FIG. 1, boundary module 26 may be configured to define boundaries for traversable regions. In some implementations, boundaries may include segments of a line or curve (depending in some implementations on the shape of the surfaces used in the virtual space). For example, in some implementations, a boundary may be a straight line segment. Boundaries may be aligned to one or more axes and/or fitted to a grid or mesh. Boundaries may be defined such that there may be no gap between the multiple boundaries of an individual traversable region. Boundaries separate individual regions from other regions and/or from edges of objects and/or surfaces. In some implementations, boundaries separate the regions that may be determined by second region module 25. In some implementations, the defined boundaries of a region determined by second region module 25 may form a bounding box, e.g. a rectangle that corresponds to the traversable region as determined. Individual boundaries that separate two regions may separate adjacent regions. Referring to FIG. 4, each of the four (in this case rectangular) regions of the top-surface of object 1 includes four boundaries. For example, the boundaries of the first region are: on the westerly, northerly, and southerly sides formed by edges of object 1, and on the easterly side formed by other regions of the top-surface of object 1, in particular non-traversable regions occupied by object 7, and the third and fourth region described above.

Referring to FIG. 1, a traversable boundary may be a boundary that separates (e.g.) two adjacent traversable regions. Boundary module 26 may be further configured to determine which of the defined boundaries are traversable boundaries. In some implementations, the boundaries for an individual traversable region may form a polygonal shape, an enclosed shape, and/or another shape. For example, the boundaries for the traversable regions of FIG. 4 may form enclosed rectangular shapes.

Figure 5:
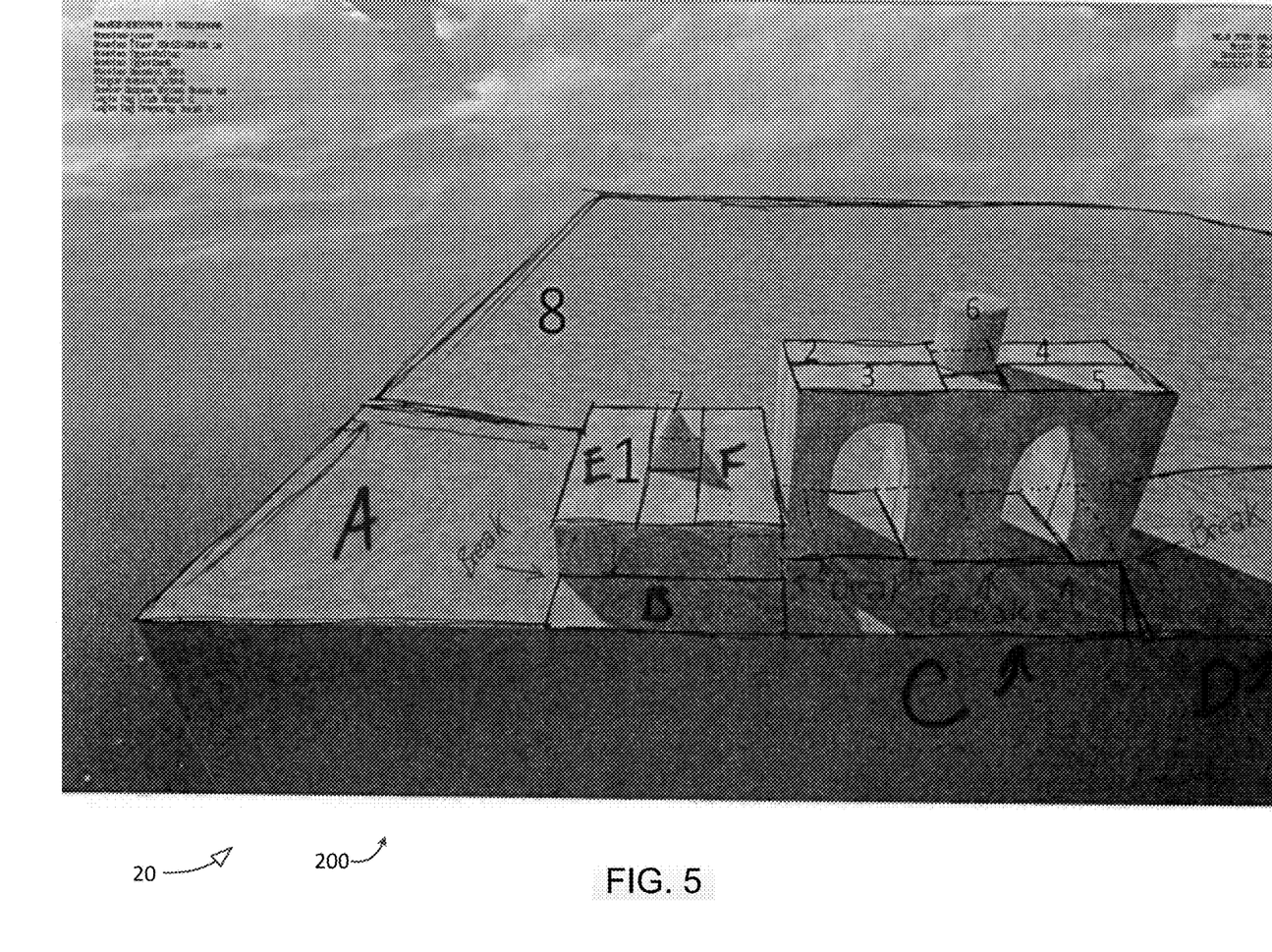

By way of illustration, FIG. 5 illustrates a view 20 of virtual space 200 that depicts traversable regions and boundaries therebetween. Area A is a rectangular traversable region to the West of object 1, in the South-West corner of the top-surface of object 8. Area A may have been determined by a second region module. Area A may have four boundaries, referred to as A-North, A-East, A-South, and A-West, that form a bounding box around the traversable region of Area A. The four boundaries of Area A may have been defined by a boundary module. Boundaries A-West and A-South correspond to the edge of object 8 and may thus be non-traversable boundaries. Boundary A-North separates two adjacent traversable regions (Area A and most of the remainder of object 8 that is not occupied by any objects). Accordingly, boundary A-North may be a traversable boundary. Boundary A-East is partially traversable and partially non-traversable. Boundary A-East includes multiple boundary segments, wherein a boundary segment is either fully traversable or fully non-traversable. The boundary segment that separates Area A from the westerly edge of object 1 may be non-traversable. The remainder of boundary A-East separates Area A from a traversable region to the South of object 1, here referred to as Area B. Accordingly, this boundary segment may be a traversable boundary segment. Referring to FIG. 1, boundary module 26 may be configured to split individual boundaries into boundary segments such that individual boundary segments are either fully traversable or fully non-traversable. In some implementations, the granularity of the smallest boundary segment may match the granularity of the grid or mesh that is used to align the regions and/or objects.

Figure 6:
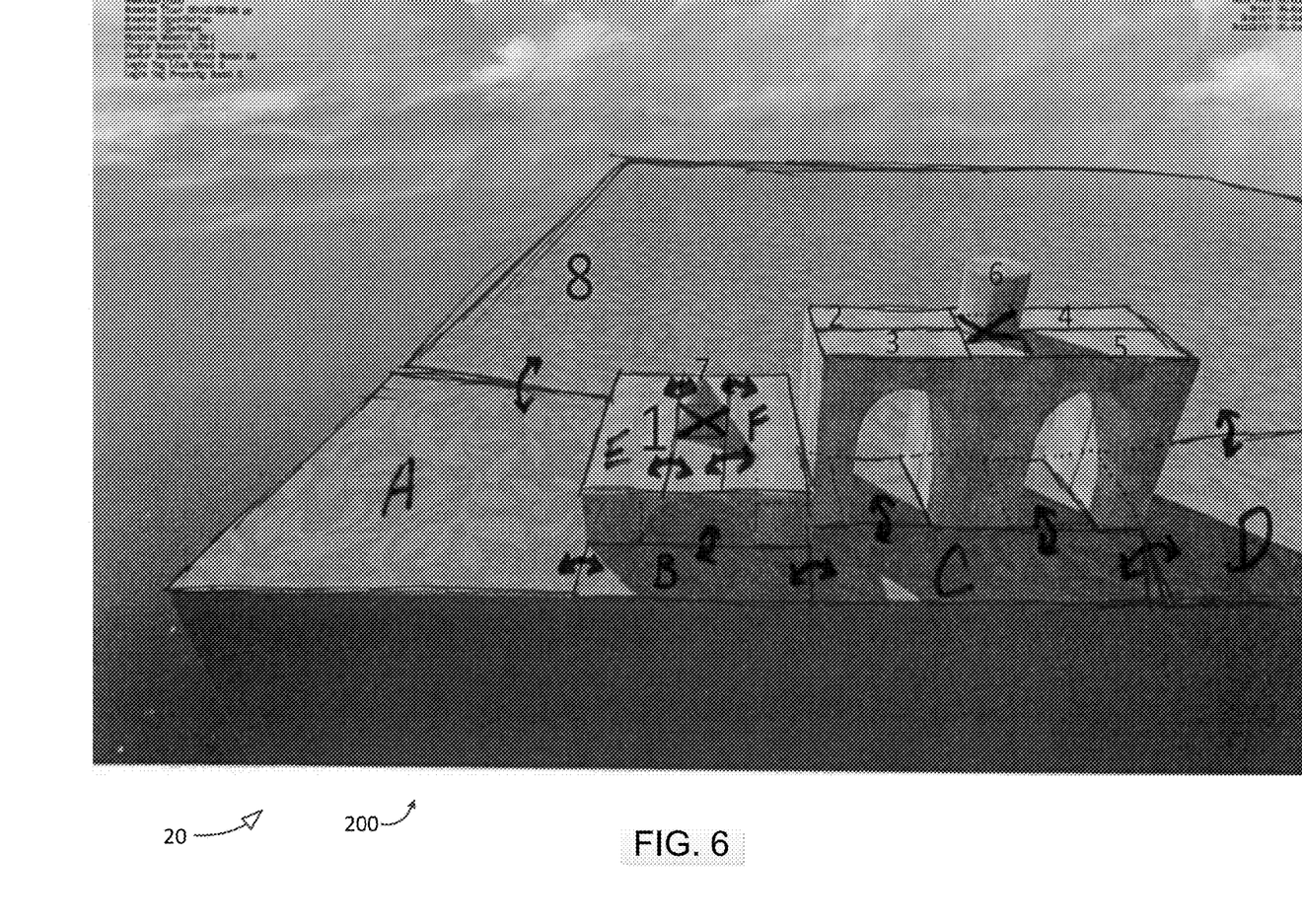

In some implementations, second region module 25 may be configured to link traversable regions that are separated by one or more traversable boundaries as determined by boundary module 26. In some implementations, second region module 25 may be configured to link traversable regions that are separated by one or more traversable boundary segments as determined by boundary module 26. Referring to FIG. 5, Area A and Area B may be linked because they are separated by a segment of boundary A-East that is a traversable boundary segment. By way of illustration, FIG. 6 illustrates a view 20 of virtual space 200 that depicts linking adjacent traversable regions. For example, the link between Area A and Area B is depicted by a double-headed arrow.

Referring to FIG. 1, map module 27 may be configured to update one or more navigation maps based on one or more determinations by one or more computer program modules. For example, a navigation map may be updated to reflect a change in one or more of the set of non-traversable regions, the set of traversable regions, and/or a set of boundaries therebetween, in particular traversable boundaries between adjacent traversable regions. Operations of map module 27 may be responsive to relocation of one or more objects. In some implementations, a particular object may occupy space in different areas of different navigation maps. Responsive to a relocation of such an object, multiple navigation maps may need to be updated as described herein.

Navigation module 28 may be configured to query a navigation map to help a character navigate in the virtual space. For example, navigation module 28 may be configured to query a navigation map on behalf of an NPC such that the NPC traverses traversable regions, in particular intelligently.

Electronic storage 50 may comprise non-transitory storage media that electronically stores information. The electronic storage media of electronic storage 50 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor 110, information received from server 12, information received from client computing platforms 14, and/or other information that enables server 12 to function as described herein.

Processor(s) 110 is configured to provide information processing capabilities in server 12. As such, processor 110 may include one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may include a plurality of processing units. These processing units may be physically located within the same device, or processor 110 may represent processing functionality of a plurality of devices operating in coordination. Processor 110 may be configured to execute modules 22-28. Processor 110 may be configured to execute modules 22-28 by software; hardware; firmware; some combination of software, hardware, and/or firmware; and/or other mechanisms for configuring processing capabilities on processor 110. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 22-28 are illustrated in FIG. 1 as being implemented within a single processing unit, in implementations in which processor 110 includes multiple processing units, one or more of modules 22-28 may be implemented remotely from the other modules. The description of the functionality provided by the different modules 22-28 described herein is for illustrative purposes, and is not intended to be limiting, as any of modules 22-28 may provide more or less functionality than is described. For example, one or more of modules 22-28 may be eliminated, and some or all of its functionality may be provided by other ones of modules 22-28. As another example, processor 110 may be configured to execute one or more additional modules that may perform some or all of the functionality attributed herein to one of modules 22-28.

Figure 7:
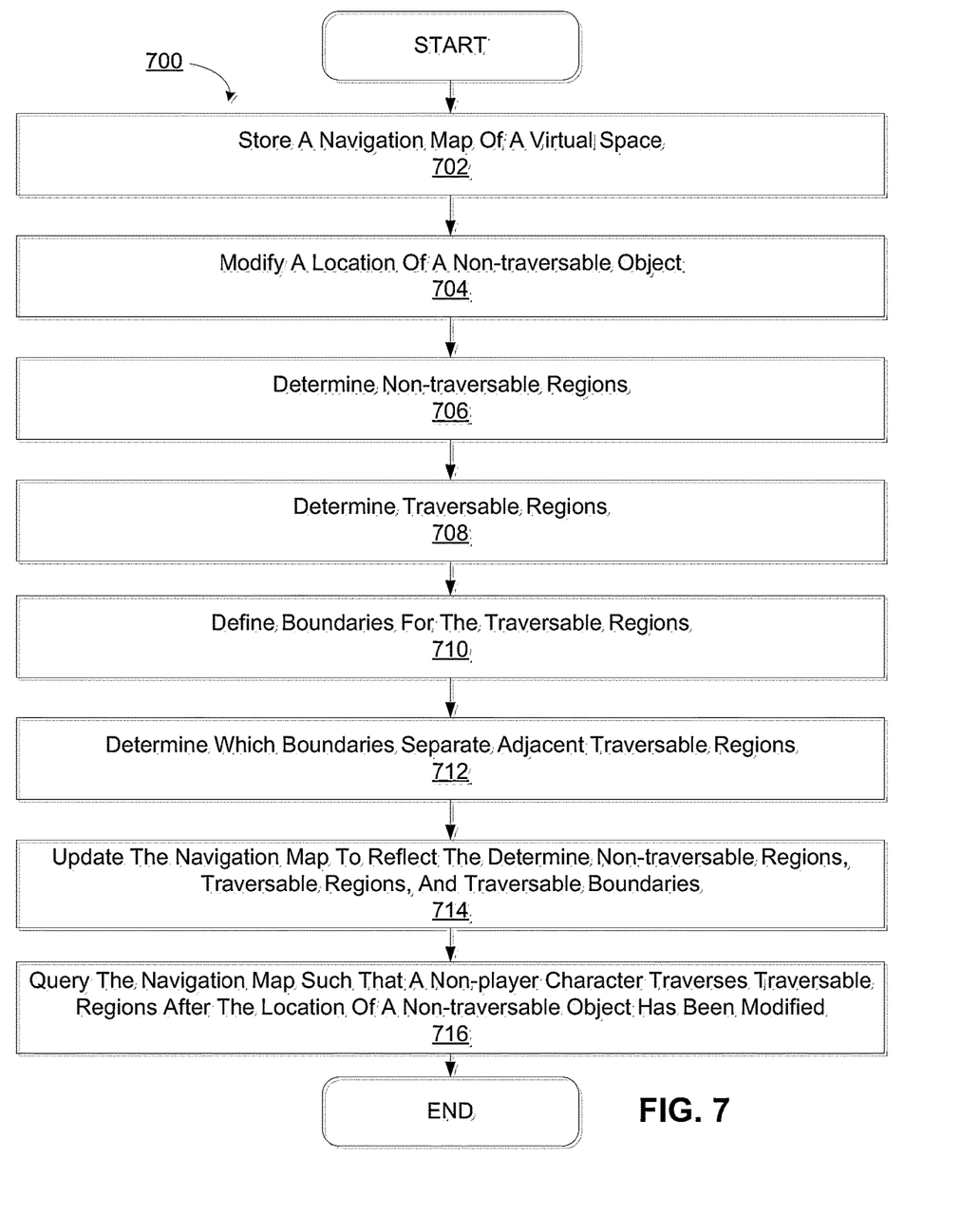
FIG. 7 illustrates a method for interactively updating a navigation map in a virtual space, in accordance with one or more embodiments.

FIG. 7 illustrates a method 700 for updating navigation maps in a virtual space, in accordance with one or more embodiments. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, a navigation map of a virtual space is stored. The navigation map includes multiple regions, the regions including traversable regions that physics of the virtual space permit characters to traverse and non-traversable regions that correspond to non-traversable objects located in the virtual space through which traversal by characters of the virtual space is not permitted by the physics of the virtual space. In some embodiments, operation 702 is performed by an electronic storage the same as or similar to electronic storage 50 (shown in FIG. 1 and described herein).

At an operation 704, instructions are obtained to modify a location of a first non-traversable object in the virtual space. The instructions are obtained during interactive gameplay by a user in the virtual space. In some embodiments, operation 704 is performed by an interaction module the same as or similar to interaction module 23 (shown in FIG. 1 and described herein).

At an operation 706, a set of non-traversable regions is determined. The set of non-traversable regions includes a first non-traversable region that corresponds to the modified location of the first non-traversable object. In some embodiments, operation 706 is performed by a region module the same as or similar to first region module 24 (shown in FIG. 1 and described herein).

At an operation 708, a set of traversable regions is determined. In some embodiments, operation 708 is performed by a region module the same as or similar to second region module 25 (shown in FIG. 1 and described herein).

At an operation 710, boundaries are defined for the set of traversable regions. Individual boundaries separate adjacent regions. In some embodiments, operation 710 is performed by a boundary module the same as or similar to boundary module 26 (shown in FIG. 1 and described herein).

At an operation 712, it is determined which of the defined boundaries are traversable boundaries. A traversable boundary separates adjacent traversable regions. In some embodiments, operation 712 is performed by a boundary module the same as or similar to boundary module 26 (shown in FIG. 1 and described herein).

At an operation 714, the navigation map is updated to reflect the determined set of non-traversable regions, the determined set of traversable regions, and the determined traversable boundaries. In some embodiments, operation 714 is performed by a map module the same as or similar to map module 27 (shown in FIG. 1 and described herein).

At an operation 716, the navigation may is queried, on behalf of a non-player character in the virtual space, such that the non-player character traverses traversable regions subsequent to modification of the location of the non-traversable object. In some embodiments, operation 716 is performed by a navigation module the same as or similar to navigation module 28 (shown in FIG. 1 and described herein).

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for interactively updating navigation maps during interactive gameplay in a virtual space, the method being implemented in a computer system comprising one or more physical processors and electronic storage storing machine-readable instructions, the method comprising:
   storing, within the electronic storage, a navigation map of the virtual space, wherein the navigation map includes multiple regions, the regions including:
      traversable regions that physics of the virtual space permit characters to traverse, and
      non-traversable regions that correspond to non-traversable objects located in the virtual space through which traversal by the characters of the virtual space is not permitted by the physics of the virtual space;
   obtaining instructions to modify a location of a first non-traversable object in the virtual space, wherein the instructions are obtained via a communications network from a client computing platform associated with a user of the virtual space during interactive gameplay by the user in the virtual space;
   determining, responsive to the instructed modification, a set of the non-traversable regions, the set of the non-traversable regions comprising one or more of the non-traversable regions, wherein the set of the non-traversable regions includes a first non-traversable region that corresponds to the modified location of the first non-traversable object;
   determining, responsive to the instructed modification, a set of the traversable regions, the set of the traversable regions comprising one or more of the traversable regions;
   defining boundaries for the set of the traversable regions, wherein individual ones of the boundaries separate adjacent regions;
   determining, responsive to the instructed modification, which of the defined boundaries of the set of the traversable regions are traversable boundaries, wherein individual ones of the traversable boundaries separate adjacent traversable regions;
   updating, responsive to the instructed modification, the navigation map to reflect the determined set of the non-traversable regions, the determined set of the traversable regions, and the traversable boundaries; and
   querying, on behalf of a non-player character in the virtual space, the updated navigation map such that the non-player character traverses traversable regions based on the updated navigation map subsequent to obtaining the instructed modification.

2. The computer-implemented method of claim 1, further comprising:
   linking, responsive to the instructed modification, the adjacent traversable regions that are separated by one or more of the traversable boundaries.

3. The computer-implemented method of claim 1, wherein the regions are aligned along one or more axes.

4. The computer-implemented method of claim 1, wherein the regions are aligned with a two-dimensional grid.

5. The computer-implemented method of claim 1, wherein the defined boundaries for individual ones of the traversable regions in the set of the traversable regions form a polygonal shape.

6. The computer-implemented method of claim 1, wherein the determination of which of the defined boundaries for the set of the traversable regions are traversable boundaries comprises splitting individual ones of the defined boundaries for the set of the traversable regions into boundary segments, such that individual ones of the boundary segments are either fully traversable or fully non-traversable.

7. The computer-implemented method of claim 1, further comprising:
   determining other sets of the non-traversable regions and other sets of the traversable regions prior to the instructed modification.

8. The computer-implemented method of claim 1, wherein the navigation map corresponds to a planar area in the virtual space.

9. The computer-implemented method of claim 1, wherein different planar areas in the virtual space correspond to different ones of the navigation maps, wherein the first non-traversable object occupies one or more regions in the different planar areas, and wherein individual ones of the navigation maps are updated independently.

10. A system configured to interactively update navigation maps during interactive gameplay in a virtual space, the system comprising:
   electronic storage configured to store a navigation map of the virtual space, wherein the navigation map includes multiple regions, the regions including:
      traversable regions that physics of the virtual space permit characters to traverse, and
      non-traversable regions that correspond to non-traversable objects located in the virtual space through which traversal by the characters of the virtual space is not permitted by the physics of the virtual space;
   one or more physical processors configured by machine-readable instructions to:
      obtain instructions to modify a location of a first non-traversable object in the virtual space, wherein the instructions are obtained via a communications network from a client computing platform associated with a user of the virtual space during interactive gameplay by the user in the virtual space;
      determine a set of the non-traversable regions, the set of the non-traversable regions comprising one or more of the non-traversable regions, wherein the set of the non-traversable regions includes a first non-traversable region that corresponds to the modified location of the first non-traversable object;
      determine a set of the traversable regions, the set of the traversable regions comprising one or more of the traversable regions;
      define boundaries for the set of the traversable regions, and determine which of the defined boundaries of the set of the traversable are traversable boundaries, wherein individual ones of the boundaries separate adjacent regions, and wherein individual ones of the traversable boundaries separate adjacent traversable regions;

update the navigation map to reflect the determined set of the non-traversable regions, the determined set of the traversable regions, and the traversable boundaries; and query the updated navigation map on behalf of a non-player character in the virtual space such that the non-player character traverses traversable regions based on the updated map subsequent to the modification of the location of the first non-traversable object.

11. The system of claim 10, wherein the one or more physical processors are further configured by machine-readable instructions to link the adjacent traversable regions that are separated by one or more of the traversable boundaries.

12. The system of claim 10, wherein the regions are aligned along one or more axes.

13. The system of claim 10, wherein the regions are aligned with a two-dimensional grid.

14. The system of claim 10, wherein the defined boundaries for individual ones of the traversable region in the set of the traversable regions form a polygonal shape.

15. The system of claim 10, wherein the one or more physical processors are further configured by machine-readable instructions to split individual ones of the defined boundaries for the set of traversable regions into boundary segments such that an individual ones of the boundary segments are either fully traversable or fully non-traversable.

16. The system of claim 10, wherein the one or more physical processors are further configured by machine-readable instructions to:

determine other sets of the non-traversable regions and other sets of the traversable regions prior to the instructed modification.

17. The system of claim 10, wherein the navigation map corresponds to a planar area in the virtual space.

18. The system of claim 10, wherein different planar areas in the virtual space correspond to different ones of the navigation maps, wherein the first non-traversable object occupies one or more regions in the different planar areas, wherein determining the set of non-traversable regions, determining the set of traversable regions, defining boundaries, and updating the navigation map are performed independently per individual ones of the navigation maps.

* * * * *